(12) United States Patent
Siebeneick

(10) Patent No.: US 8,297,633 B2
(45) Date of Patent: Oct. 30, 2012

(54) SUPPORT BEARING FOR A VEHICLE

(75) Inventor: Juergen Siebeneick, Oberwesel (DE)

(73) Assignee: GM Global Technology Operations LLC, Detroit, MI (US)

( * ) Notice: Subject to any disclaimer, the term of this patent is extended or adjusted under 35 U.S.C. 154(b) by 70 days.

(21) Appl. No.: 12/235,458

(22) Filed: Sep. 22, 2008

(65) Prior Publication Data

US 2009/0103848 A1    Apr. 23, 2009

(30) Foreign Application Priority Data

Sep. 27, 2007 (DE) .......................... 10 2007 046 219

(51) Int. Cl.
*B60G 15/00* (2006.01)
*B60G 15/06* (2006.01)

(52) U.S. Cl. ... 280/124.147; 280/124.155; 280/124.157; 267/220

(58) Field of Classification Search ............. 280/86.752, 280/124.146, 124.147, 124.154, 124.155, 280/124.157, 124.158; 267/64.15, 219, 220; 267/292, 293; 384/611
See application file for complete search history.

(56) References Cited

U.S. PATENT DOCUMENTS

| | | | | |
|---|---|---|---|---|
| 4,274,655 A * | 6/1981 | Lederman | ............... | 280/124.155 |
| 4,531,759 A * | 7/1985 | Rezanka et al. | ....... | 280/124.155 |
| 4,552,467 A * | 11/1985 | Takei et al. | .................... | 384/615 |
| 5,078,370 A * | 1/1992 | McClellan | .................... | 267/220 |
| 5,678,810 A * | 10/1997 | Summers et al. | ............. | 267/220 |
| 5,690,319 A * | 11/1997 | Robinson et al. | .......... | 267/64.19 |
| 6,736,381 B2 * | 5/2004 | Chesne | .......................... | 267/220 |
| 6,843,472 B2 * | 1/2005 | Henry et al. | ................ | 267/64.24 |
| 6,923,461 B2 | 8/2005 | Momose et al. | | |
| 7,077,248 B2 * | 7/2006 | Handke et al. | ........... | 188/321.11 |
| 7,364,177 B2 * | 4/2008 | Handke et al. | ......... | 280/124.147 |
| 7,540,515 B2 * | 6/2009 | Koumura | ............... | 280/124.154 |
| 2001/0015537 A1* | 8/2001 | De Fontenay et al. | . | 280/124.155 |
| 2003/0025257 A1* | 2/2003 | Handke | ......................... | 267/220 |
| 2004/0168870 A1* | 9/2004 | Handke et al. | ........... | 188/321.11 |
| 2004/0222576 A1 | 11/2004 | Oldenettel | | |
| 2004/0245691 A1* | 12/2004 | Handke et al. | ................. | 267/292 |

(Continued)

FOREIGN PATENT DOCUMENTS

DE    2834528 A1    2/1980

(Continued)

OTHER PUBLICATIONS

German Patent Office, German Search Report for Application No. 102007046219.2, dated Jun. 30, 2008.

(Continued)

*Primary Examiner* — Joseph Rocca
(74) *Attorney, Agent, or Firm* — Ingrassia Fisher & Lorenz, P.C.

(57) ABSTRACT

A support bearing for a vehicle is provided that includes, but is not limited to a rubber bearing that encloses one end of a strut element and introduces the lateral and longitudinal forces of the strut into a vehicle body. A ball bearing allows rotational movements between a spring element and the car body. For this purpose, the ball bearing of the support bearing is supported on the car body with a ball bearing race that features a first ball track. A second ball track of the ball bearing is arranged on a rubber bearing housing together with one end of the spring element.

4 Claims, 5 Drawing Sheets

U.S. PATENT DOCUMENTS

| | | | |
|---|---|---|---|
| 2005/0247531 A1* | 11/2005 | Oota | 188/322.19 |
| 2007/0144850 A1* | 6/2007 | Hattori | 188/322.16 |
| 2007/0170684 A1* | 7/2007 | Ohkita et al. | 280/124.147 |
| 2007/0267793 A1* | 11/2007 | Chamousset et al. | 267/220 |
| 2008/0048370 A1* | 2/2008 | Corlet et al. | 267/220 |

FOREIGN PATENT DOCUMENTS

| | | | |
|---|---|---|---|
| DE | 3204816 A1 | 9/1982 |
| DE | 8235995 U1 | 6/1983 |
| DE | 3501106 A1 | 7/1986 |
| DE | 68904113 T2 | 5/1993 |
| DE | 10041359 A1 | 3/2002 |
| DE | 10229584 A1 | 3/2003 |
| EP | 342725 A1 * | 11/1989 |
| EP | 0985565 A1 | 3/2000 |
| EP | 1609632 A2 | 12/2005 |
| FR | 2783203 A1 | 3/2000 |
| FR | 2915929 A1 | 11/2008 |
| GB | 2112497 A | 7/1983 |

OTHER PUBLICATIONS

UK IPO, British Search Report for Application No. 0817276.9, dated Dec. 15, 2008.

* cited by examiner

SUPPORT BEARING FOR A VEHICLE

CROSS-REFERENCE TO RELATED APPLICATION

This application claims priority to German Patent Application No. 102007046219.2, filed Sep. 27, 2007, which is incorporated herein by reference in its entirety.

TECHNICAL FIELD

The technical field generally relates to a support bearing for a vehicle, and more particularly relates to a support bearing having a rubber bearing that encloses one end of a strut element and introduces the lateral and longitudinal forces of the strut into a car body, and the rubber bearing transmits damping forces of a vibration damper to the car body. The technical field also relates to a rigid rubber bearing housing that encloses an elastic rubber element of the rubber bearing and a ball bearing allows rotational movements between a spring element and the car body.

BACKGROUND

A known support bearing of this type and its function are illustrated in FIG. 4 and FIG. 5. FIG. 4 shows the design of a known support bearing 30 and FIG. 5 shows the function of the known support bearing 30.

FIG. 4 shows a schematic cross section through the known support bearing 30, and the support bearing 30 is realized rotationally symmetrical to a strut axis 31 such that only one half of the support bearing 30 is visible in FIG. 4. One end 4 of a strut element 5 that forms a vibration damper 21 in this case is surrounded by an annular metallic body 39 in the form of an inner ring that cooperates with an annular rubber bearing 3. The annular rubber bearing 3 features at least one elastic rubber element 20 and a rubber bearing housing 8, wherein the end 4 of the strut element 5 protrudes into a center 23 of the metallic body 39. The rubber bearing 3 introduces lateral and longitudinal forces of the strut element 5 into the car body 7. For this purpose, the rubber bearing 3 features an inflexible and rigid rubber bearing housing 8 with a rotationally symmetrical shoulder 18 flanged thereon.

A first ball bearing race 11 is fixed on this shoulder 18 of the rubber bearing housing 8. A second ball bearing race 19 of the ball bearing 9, in contrast, is rotatable relative to the shoulder 18 and the rubber bearing housing 8. This rotatable second ball bearing race 19 carries one end 13 of a spring element 10 in the form of a coil spring 16. In addition, one end 25 of a bellows 24 that protects the strut element 5 from contamination is non-positively clamped between the end 13 of the spring element 10 and the second ball bearing race 19.

In this known configuration of a support bearing 30, the strut element 5 forms the piston rod of the vibration damper 21. The vibration damper 21 is fixed on the car body 7 such that it is prevented from turning by means of the rubber bearing 3, the shoulder 18 of the rubber bearing housing 8 and another elastic rubber element 40 in this known embodiment of a support bearing 30. This support bearing 30 consequently has the disadvantage that the strut element 5 and the rubber bearing 3 cannot be turned relative to the car body and the coil spring 16 turns about the rubber bearing housing 8 during a steering maneuver due to the ball bearing 9 such that only the torsional movements of the coil spring 16 of the coil strut are compensated by the ball bearing 9.

FIG. 5 shows a schematic diagram of the function of such a known support bearing 30 according to FIG. 4, in which the rubber bearing 3 cannot be turned relative to the car body 7. The double arrow Q in FIG. 5 indicates that the support bearing 30 should have a high transverse rigidity (Q) in the transverse direction. The support bearing 30 should have a lesser rigidity in the longitudinal direction as indicated with the arrows (L) in order to improve the traveling comfort in the longitudinal direction.

In this context, the term transverse direction refers to the direction extending transverse to the driving direction of the vehicle and the term longitudinal direction refers to the direction extending in the driving direction of the vehicle, and the driving direction is indicated by the position of the front wheel 32 in FIG. 5. In order to realize this different rigidity, the rubber bearing 3 contains recesses 14 and 15 that weaken the rubber bearing 3 in the longitudinal direction (L). Such rigidity-reducing recesses are not provided in the transverse direction.

A known support bearing 30 of this type has the disadvantage that the rubber bearing 3 of the support bearing 30 maintains its position when a front wheel 32 is turned into a curve position 33 such that the rigidity in the direction of the arrow (K) is significantly reduced in comparison with the transverse rigidity (Q) and a greater liability must be accepted while driving through a curve, in which the front wheel 32 is turned into the curve position 33.

In a MacPherson front axle with struts 6, it is not only disadvantageous that the rigidity decreases while driving through curves, but the strut element 5 and the center 23 of the support bearing also are respectively aligned with the center of rotation of an axle pin of the front wheel 32 such that rotating seals must be accepted.

In view of the foregoing, it is desirable to develop a support bearing that at least reduces and preferably substantially eliminates the disadvantages of the state of the art and ensures that little or no reduction of the transverse rigidity occurs. It should furthermore be ensured that no rotating seals are required while driving through curves, particularly in pneumatic struts such as, for example, on a MacPherson front axle. In addition, other desirable features and characteristics will become apparent from the subsequent summary and detailed description and the appended claims, taken in conjunction with the accompanying drawings and this background.

SUMMARY

This objective, and other objectives, desirable features, and characteristics, are attained with a support bearing for a vehicle. The support bearing includes, but is not limited to a rubber bearing that encloses one end of a strut element. The rubber bearing introduces the lateral and longitudinal forces of the strut into a car body. A rigid rubber bearing housing encloses the rubber bearing and a ball bearing allows rotational movements between a spring element and the car body. For this purpose, the ball bearing of the support bearing is supported on the car body with a ball bearing race that features a first ball track. A second ball track of the ball bearing is arranged on the roller bearing housing together with one end of the spring element.

This support bearing provides the advantage that the rubber bearing is now rotatably supported in the support bearing because the rubber bearing housing cooperates with a ball track of the ball bearing that is not supported on the car body like the ball bearing race. This ball track of the ball bearing can either be machined into a second ball bearing race or into the rigid rubber bearing housing of the rubber bearing. Since one end of the spring element is also arranged on the rubber bearing housing and the rubber bearing accommodates the strut element, practically the entire strut is rotatably supported relative to the car body with the inventive support bearing.

This support bearing can still introduce the lateral and longitudinal forces of the strut, as well as the damping forces of the vibration damper, into a car body. However, the lateral and longitudinal forces of the strut are introduced by means of a ball bearing. This support bearing also provides the advantage that the full transverse rigidity of the rubber bearing is preserved in all turning or curve positions of a front wheel because it is now also able to turn and therefore advantageously ensures a stable cornering ability.

The roller bearing of the support bearing may be structured in different ways. The rubber bearing is preferably a metal-rubber element. Such metal-rubber elements have the advantage that, for example, the elastic rubber element of the rubber bearing structure can be vulcanized on the rigid rubber bearing housing of metal, and the vulcanization process produces a bonded joint between the rigid rubber bearing housing and the elastic rubber element. The support bearing also has a rubber bearing that has different rigidities in the transverse direction and in the longitudinal direction. This is achieved by providing the elastic rubber element with recesses that are arranged in such a way that the rubber bearing has a lesser rigidity in the longitudinal direction than in the transverse direction.

The strut may be realized in different ways. In one embodiment of the invention, the strut consists of a coil strut, in which a coil spring takes over the spring function. In another embodiment of the invention, it is also possible to merely use a telescopic rod that is secured against turning instead of the strut and to shift the spring function and the vibration damping function to a torsion spring arrangement. It may also be advantageous to utilize a strut in the form of a pneumatic strut. In such pneumatic suspensions, the support bearing also provides clear advantages in comparison with the state of the art.

In another embodiment of the invention, the rubber bearing housing features a shoulder. A second ball bearing race with a second ball track may be arranged on this shoulder. However, it is also possible to arrange the spring element on this shoulder. In one such embodiment, the ball bearing race is arranged on one side of the shoulder and the spring element is arranged on the opposite side of the shoulder. It is furthermore possible to arrange another elastic rubber element between the car body and the first ball bearing race in order to advantageously improve the noise insulation and the tolerance situation.

It is also proposed that the strut features a central vibration damper, one end of which is detachably fixed in the center of the rubber bearing of the support bearing. For this purpose, the vibration damper may be at least partially arranged in a bellows, and one end of the bellows is also fixed on the shoulder of the rubber bearing housing of the support bearing.

In another embodiment of the invention, one end of the pneumatic strut encloses the rubber bearing housing with a cap. The second ball track is integrally formed on the cap. Such an embodiment of the pneumatic strut provides the advantage that no additional mounts are required for a second ball bearing race. The balls of the ball bearing rather roll directly on the second ball track that is integrally formed on the cap arranged at the end of the pneumatic strut.

Instead of a vibration damper, the pneumatic strut may also feature a central telescopic rod, one end of which is detachably fixed in the center of the rubber bearing of the support bearing. In this case, the vibration damping may be realized in addition to the actual support bearing or with the aid of a torsion damping element.

BRIEF DESCRIPTION OF THE DRAWINGS

The detailed description will hereinafter be presented in conjunction with the following drawing figures, wherein like numerals denote like elements.

DETAILED DESCRIPTION

The following detailed description is merely exemplary in nature and is not intended to limit the application and uses. Furthermore, there is no intention to be bound by any theory presented in the preceding summary and background or the following detailed description.

Figure 1:
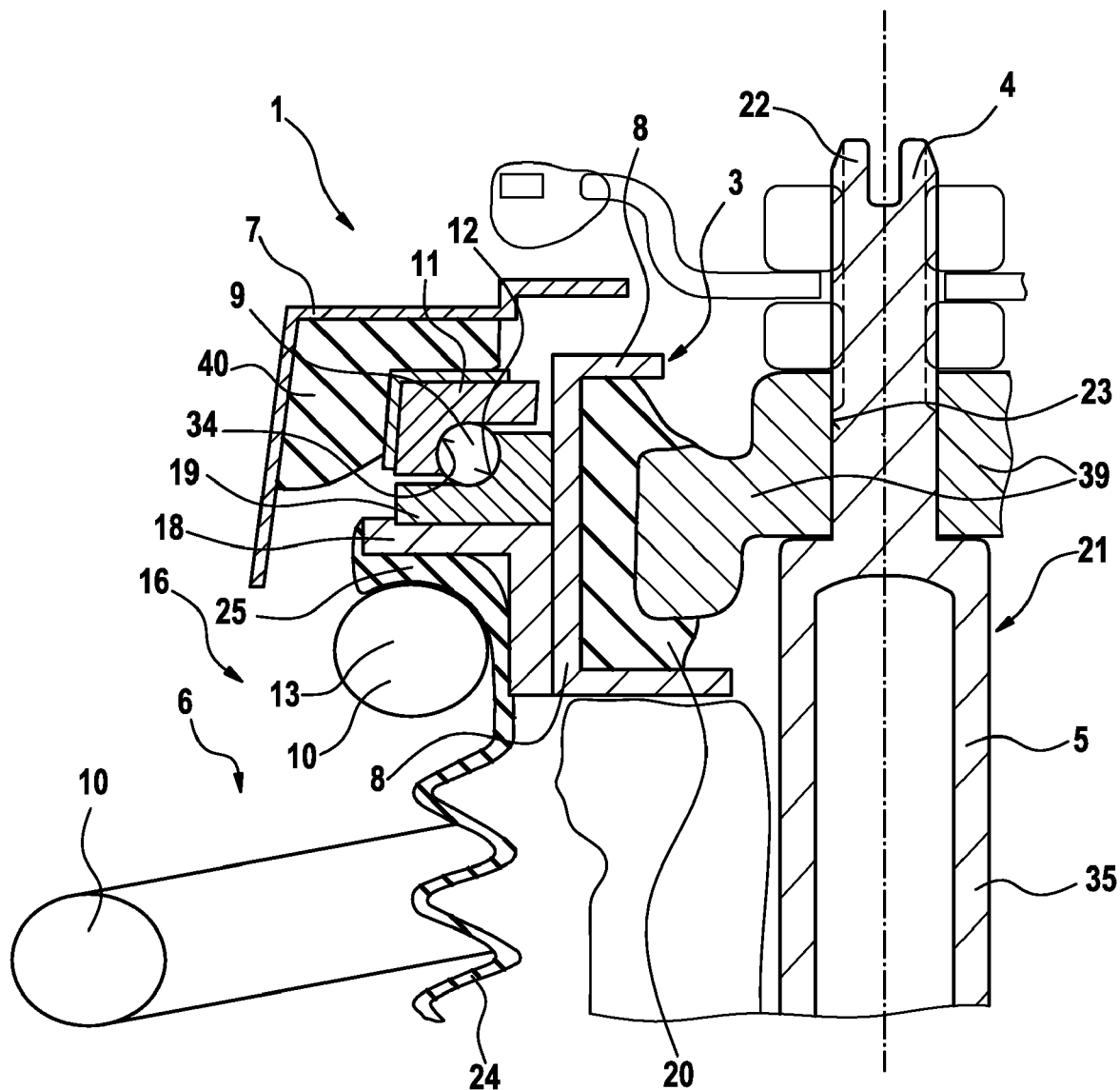
FIG. 1 shows a schematic cross section through a support bearing according to a first embodiment of the invention.

FIG. 1 shows a schematic cross section through a support bearing 1 according to a first embodiment. Components with the same functions as in the above-described figures of the state of the art are identified by identical reference symbols and not discussed in detail. Such a support bearing 1 for a vehicle features a central rubber bearing 3 that encloses one end 4 of a strut element 5 (e.g., one end 22 of a vibration damper 21 by means of an annular metallic body 39 in the form of an inner ring). The rubber bearing 3 features at least one elastic rubber element 20 and a rubber bearing housing 8 in this embodiment. The elastic rubber element 20 is surrounded by the rigid rubber bearing housing 8 in this case. The rubber bearing 3 introduces the lateral and the longitudinal forces of the strut 6 into a car body 7 by means of a ball bearing 9 with a first and a second ball bearing race 11 and 19.

For this purpose, a shoulder 18 is arranged on this rubber bearing housing 8 and features a second ball bearing race 19 with a second ball track 12 toward the car body 7. The end 13 of a spring element 10 of a coil spring 16 of a coil strut is arranged on the shoulder 18 opposite of this second ball bearing race 19. One end 25 of a bellows 24 is arranged between the end 4 of the strut 6 and the shoulder 18 of the roller bearing housing 8, wherein said bellows protects a central piston rod 35 of a vibration damper 21 from contamination.

The entire coil strut therefore is rotatably supported in the support bearing 1, and the first ball bearing race 11 is connected to the car body 7 by means of another elastic rubber element 40. The elastic rubber element 20 and elastic rubber element 40 may respectively feature a metal-rubber material, in which rubber structures are vulcanized on metal structures such that a bonded joint with the metal structure is produced. This support bearing 1 provides the advantage that it rotatably supports the entire strut 6 in one ball bearing 9.

Figure 2:
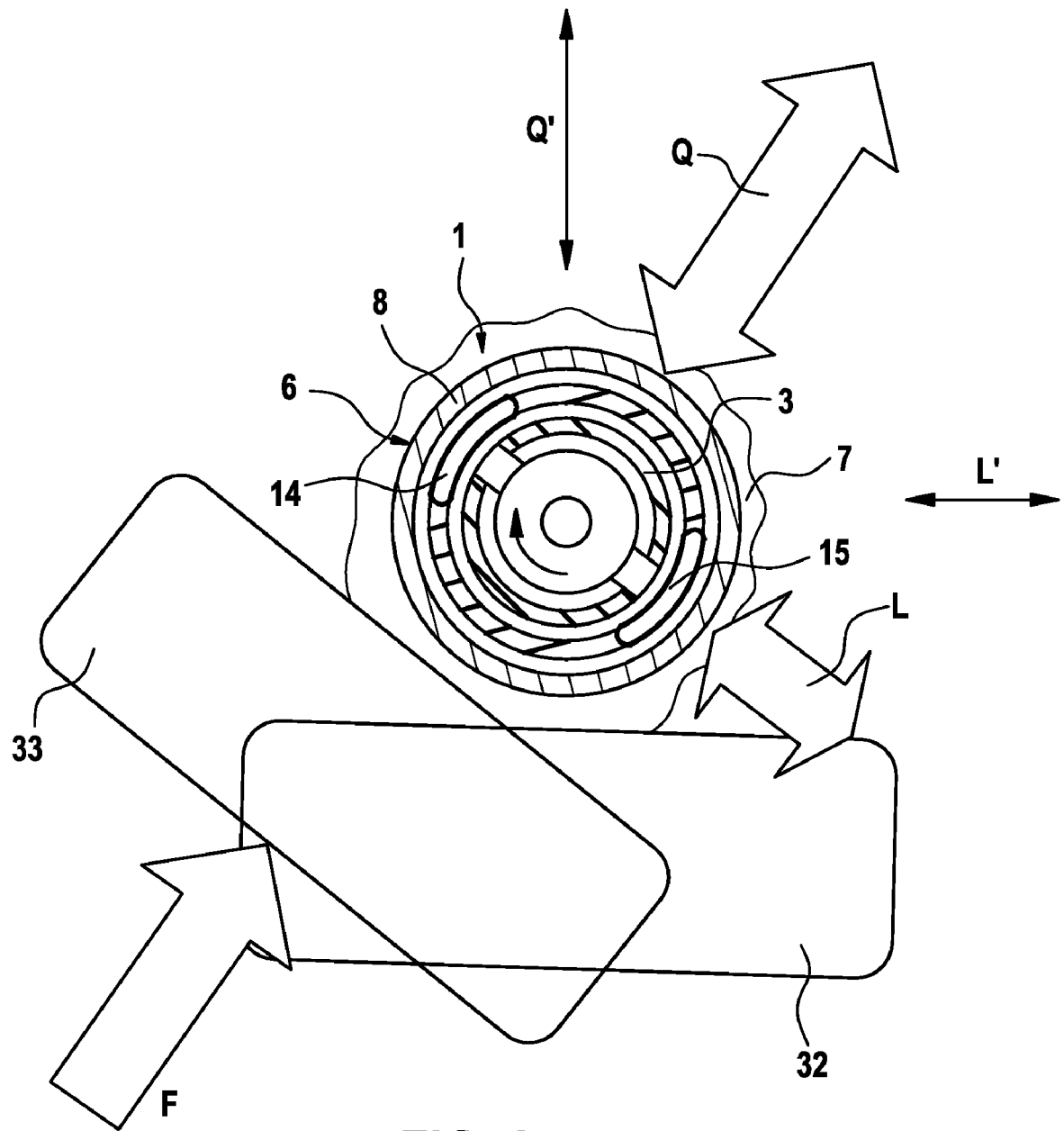
FIG. 2 shows a schematic diagram of the function of the support bearing according to FIG. 1.
Figure 5:
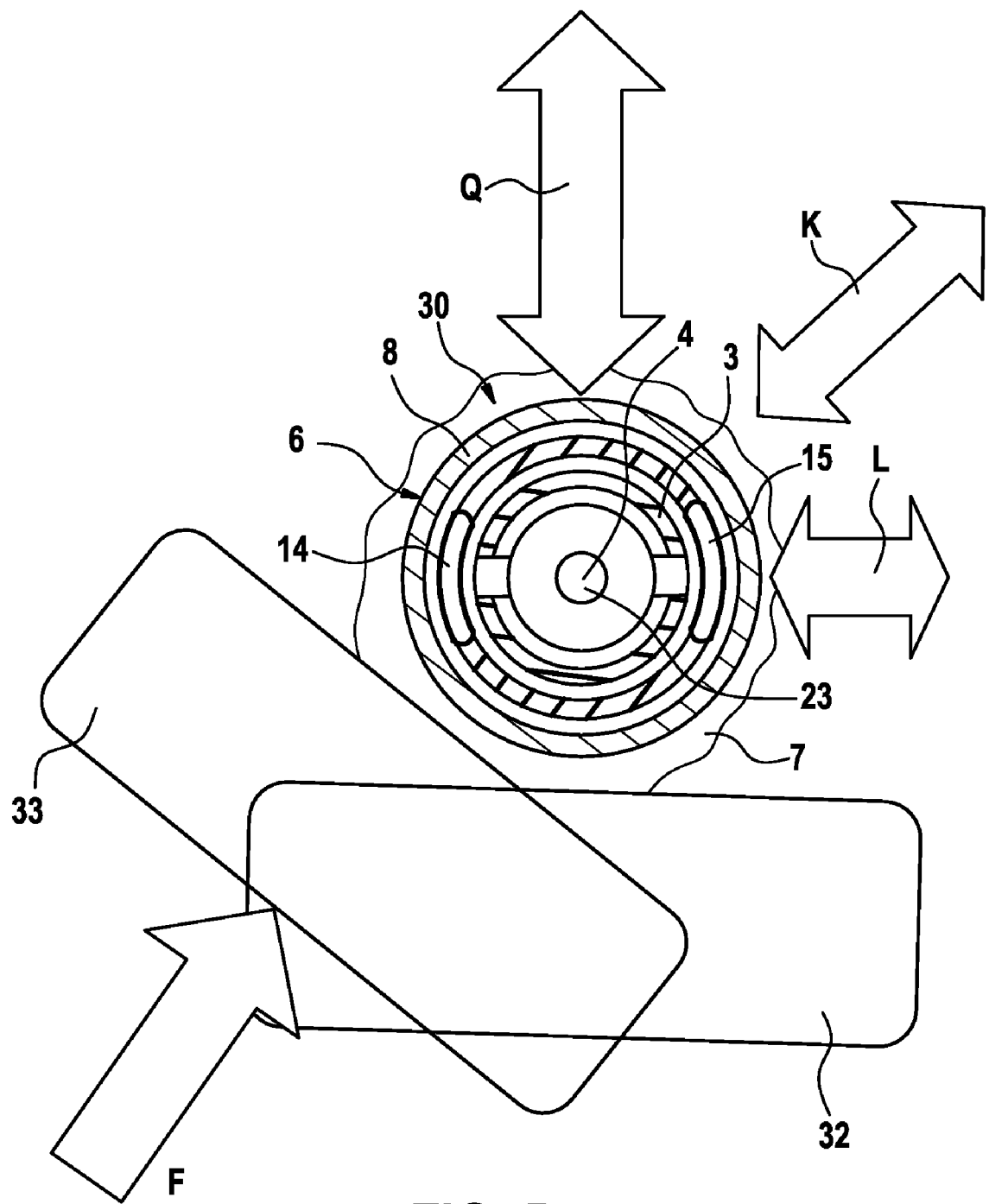
FIG. 5 shows a schematic diagram of the function of the support bearing according to the state of the art.

FIG. 2 shows a schematic diagram of the function of the support bearing 1. This functional diagram needs to be compared with the functional diagram according to FIG. 5, and such a comparison with the functional diagram of a conventional support bearing 30 as it is shown in FIG. 5 makes it clear that the rubber bearing 3 according to FIG. 1 is able to participate in the turning movement of a front wheel 32 into a curve position 33 such that the optimal high transverse rigidity (Q) is available in all curve positions 33 of the front wheel 32 while the correspondingly lesser longitudinal rigidity (L) predominates in the driving direction.

Figure 3:
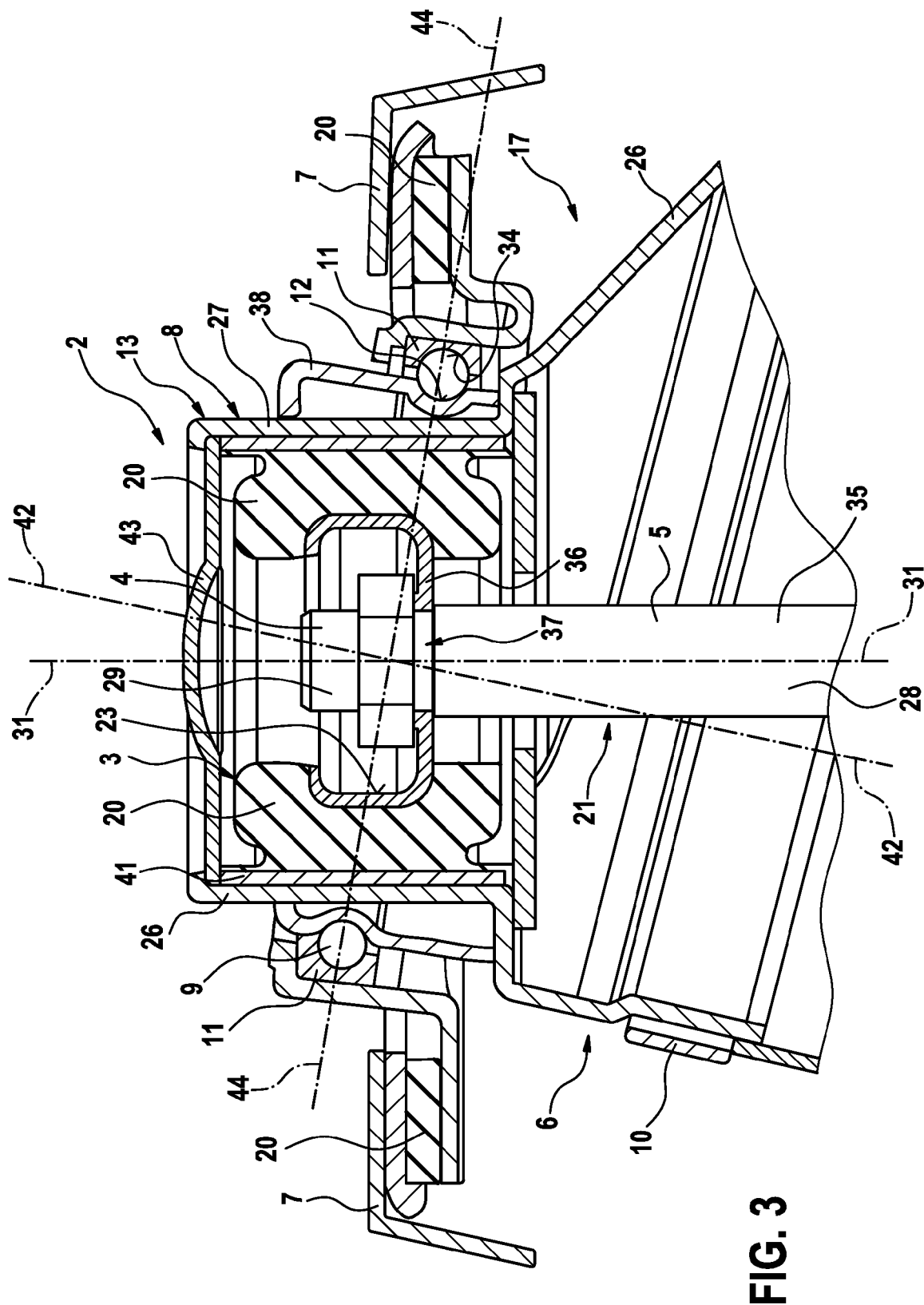
FIG. 3 shows a schematic cross section through a support bearing according to a second embodiment of the invention.
Figure 4:
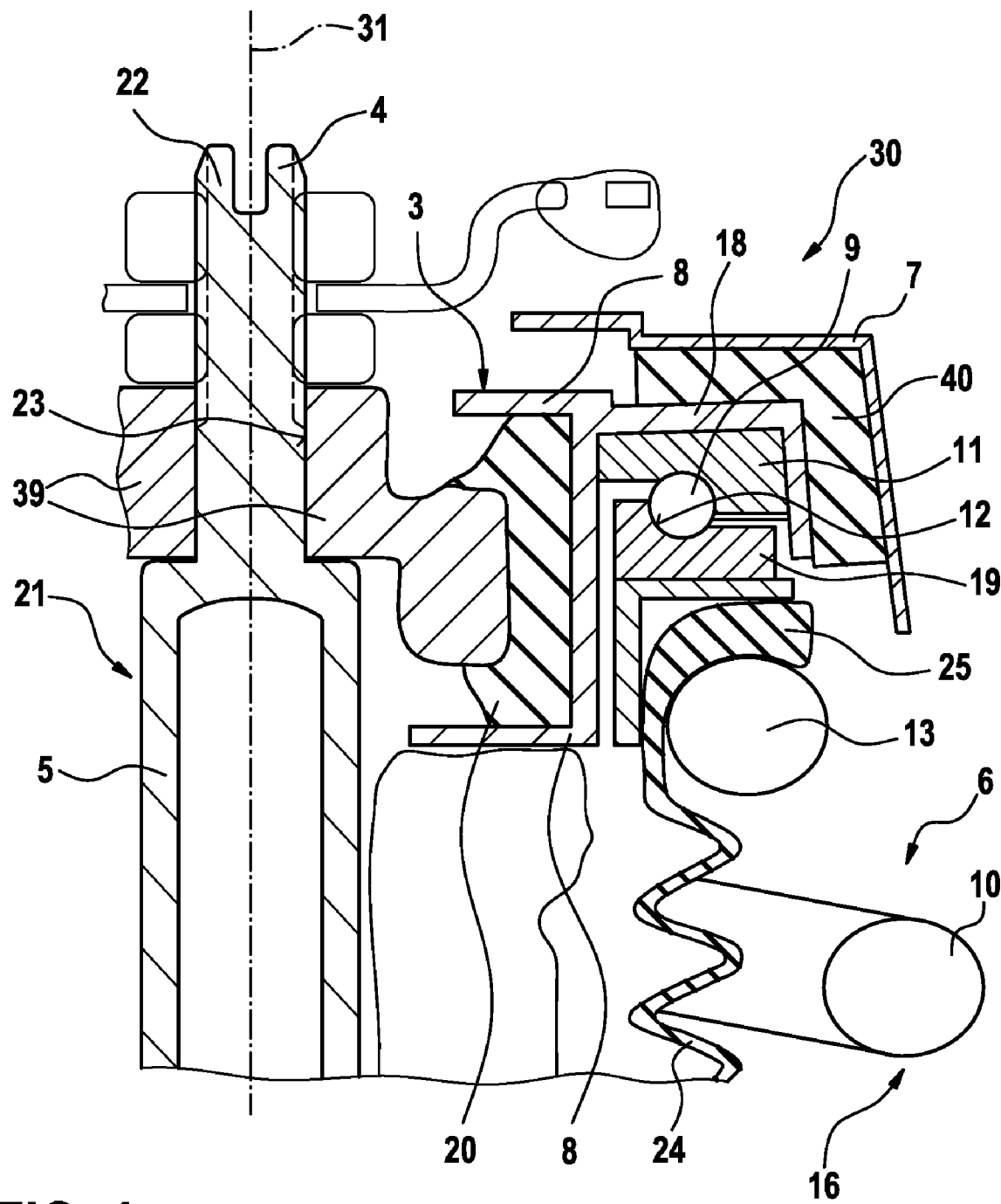
FIG. 4 shows a schematic cross section through a support bearing according to the state of the art.

FIG. 3 shows a schematic cross section through a support bearing 2 according to a second embodiment. This support bearing 2 is intended for a pneumatic strut 17 and features a spring element 10 in the form of a pneumatic spring that once again serves as the central strut element 5 and features a central piston rod 35 of a vibration damper 21 that is arranged in a center 23 of the rubber bearing 3 with its end 4. In this embodiment, the rubber bearing 3 features an inner ring 36 of metal, onto which the elastic rubber element 20 is vulcanized or positively pressed.

This inner ring 36 has a central opening 37, through which the piston rod 35 of the vibration damper 21 is pushed and fixed. Instead of the central piston rod 35, it is also possible to arrange a central stabilizing element in the form of a telescopic rod 28 in the center 23 of the roller bearing 3 with its end 29. The rubber bearing 3 furthermore features an outer ring 41 that forms a metal-rubber element together with the elastic rubber element 20.

The outer ring 41 of the rubber bearing 3 is fitted into a rubber bearing housing 8 in the form of a pneumatic spring cap 27 that simultaneously represents the end 26 of the pneumatic strut. The pneumatic spring cap 27 is sealed in an air-tight fashion by a cap cover 43 in this embodiment or constructed in the form of an air-tight cap that accommodates the outer ring 41 of the rubber bearing 3. In this embodiment, the support bearing 2 is not realized axially symmetrical to the strut axis 31. The rotational axis 42 of the ball bearing 9 rather is directed through a sliding joint provided in MacPherson axles.

A ring element 38 is arranged on the cap 27 and encloses the cap 27. The ring element 38 features a second ball track 12 that is compatible with the first ball track 34. The plane 44 of the ball bearing is inclined relative to the central axis 31 of the strut 6 due to the above-described design such that the axis 31 does not extend orthogonal to the ball bearing plane 44.

In this case, the entire strut 6 with the rubber bearing 3 is also rotatably relative to the car body 7 and fulfills the advantageous functions described above with reference to FIG. 2.

While at least one exemplary embodiment has been presented in the foregoing detailed description, it should be appreciated that a vast number of variations exist. It should also be appreciated that the exemplary embodiment or exemplary embodiments are only examples, and are not intended to limit scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A support bearing for a vehicle, comprising:
    a strut element;
    a rubber bearing comprising an elastic rubber element enclosing one end of the strut element, and introducing a lateral force and a longitudinal force of a strut into a body of the vehicle;
    a ball bearing adapted to permit rotational movement between a spring element and the body of the vehicle, wherein the ball bearing is supported on the body of the vehicle with a first ball bearing race comprising a first ball track and a second ball bearing race arranged on a rubber bearing housing with an end of the spring element, wherein the ball bearing provides angular contact with the first ball bearing race and the second ball bearing race at an angle that is not parallel to the axial direction of the strut element;
    a shoulder arranged on the rubber bearing housing, the shoulder being substantially L-shaped when viewed in cross-section and having a vertical leg adjacent to said rubber bearing housing and a horizontal leg extending radially away from said rubber bearing housing;
    wherein the first and second bearing tracks comprise respective upper and lower bearing tracks that are substantially L-shaped when viewed in cross-section;
    wherein the upper bearing race comprises an outer portion that extends below a center line of the ball bearing, which forms a lower leg of the substantially L-shaped bearing tracks, and said upper bearing race further comprises an inner portion with a substantially horizontal portion that forms a horizontal leg of the substantially L-shaped bearing tracks; and
    wherein a bottom portion of the lower bearing race is arranged on the horizontal leg of the shoulder and wherein an inner portion of the lower bearing race is adjacent to the rubber bearing housing; and
    wherein the strut is a pneumatic strut.

2. The support bearing according to claim 1, wherein a pneumatic spring cap seals the pneumatic strut and the rubber bearing is arranged in the pneumatic spring cap.

3. The support bearing according to claim 1, wherein one end of the pneumatic strut encloses the rubber bearing in a substantially air-tight fashion with a cap and a second ball track is integrally formed on the cap.

4. The support bearing according to one of the preceding claims, wherein the pneumatic strut comprises a central telescopic rod having one end detachably fixed in a center of the rubber bearing of the support bearing.

* * * * *